United States Patent
Luo (10) Patent No.: US 10,822,109 B2
(45) Date of Patent: Nov. 3, 2020

(54) METHODS AND SYSTEMS FOR DETERMINING AIRSPEED OF AN AIRCRAFT

(71) Applicant: The Boeing Company, Chicago, IL (US)

(72) Inventor: Jia Luo, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 261 days.

(21) Appl. No.: 15/862,703

(22) Filed: Jan. 5, 2018

(65) Prior Publication Data

US 2019/0210740 A1  Jul. 11, 2019

(51) Int. Cl.
| | | |
|---|---|---|
| *B64D 43/02* | (2006.01) | |
| *G01C 5/00* | (2006.01) | |
| *G01P 3/62* | (2006.01) | |
| *G01S 19/13* | (2010.01) | |
| *G01C 5/06* | (2006.01) | |
| *G01P 5/16* | (2006.01) | |

(52) U.S. Cl.
CPC ............. *B64D 43/02* (2013.01); *G01C 5/005* (2013.01); *G01P 3/62* (2013.01); *G01S 19/13* (2013.01); *G01C 5/06* (2013.01); *G01P 5/16* (2013.01)

(58) Field of Classification Search
CPC .................................. G01P 3/62; B64D 43/02
See application file for complete search history.

(56) References Cited

U.S. PATENT DOCUMENTS

| | | | |
|---|---|---|---|
| 5,349,347 A | 9/1994 | Muller | |
| 5,797,105 A | 8/1998 | Nakaya et al. | |
| 6,507,289 B1 * | 1/2003 | Johnson | G01S 7/4004 340/970 |
| 6,564,628 B1 | 5/2003 | Leblond et al. | |
| 6,757,624 B1 | 6/2004 | Hwang et al. | |

(Continued)

FOREIGN PATENT DOCUMENTS

| | | |
|---|---|---|
| EP | 1391736 | 2/2004 |
| EP | 2434296 | 3/2012 |

(Continued)

OTHER PUBLICATIONS

Juliana P. Leitzke and Hubert Zangl, Wireless Differential Pressure Measurement for Aircraft, 978-1-5090-4234-0/17/$31.00 © 2017 IEEE (Year: 2017).*

(Continued)

*Primary Examiner* — Matthew G Marini
(74) *Attorney, Agent, or Firm* — Vivacqua Law, PLLC (57) ABSTRACT

Aircraft and methods and systems for determining airspeed of an aircraft. The methods and systems allow for calculation of airspeed in near-ground and on-ground aircraft operation. A GPS altitude and a vertical acceleration of the aircraft are obtained for a current time frame. A geometric altitude for the previous time frame is determined, and the difference between the GPS altitude and geometric altitude are combined with the vertical acceleration to calculate a geometric altitude rate of change. The geometric altitude rate of change is used to calculate a pressure altitude rate of change, which is used to calculate a pressure altitude for the aircraft. A static pressure is calculated from the pressure altitude, and the airspeed is calculated using the static pressure.

24 Claims, 5 Drawing Sheets

(56) References Cited

U.S. PATENT DOCUMENTS

| | | |
|---|---|---|
| 6,804,614 B1 | 10/2004 | McGraw et al. |
| 7,299,113 B2 | 11/2007 | Parlini |
| 7,389,164 B1 | 6/2008 | Conner et al. |
| 7,599,766 B2 * | 10/2009 | Ardila .................. G01C 23/00 701/18 |
| 9,383,381 B2 | 7/2016 | Luo |
| 2005/0159857 A1 | 7/2005 | Parlini |
| 2009/0222150 A1 | 9/2009 | Preaux |
| 2010/0100260 A1 | 4/2010 | McIntyre et al. |
| 2010/0185343 A1 | 7/2010 | Broquet et al. |
| 2011/0238373 A1 | 9/2011 | Foster et al. |
| 2011/0264308 A1 | 10/2011 | Perrie et al. |

FOREIGN PATENT DOCUMENTS

| | | |
|---|---|---|
| EP | 2919018 A1 | 9/2015 |
| FR | 2988835 | 10/2013 |
| WO | 2006048674 A1 | 5/2006 |

OTHER PUBLICATIONS

EP, Search Report; EP Patent Application 18208115.8, 5 pages (dated Jun. 12, 2019).

EP, European Search Report and Written Opinion; Patent Application No. 11179827.8, 6 pages (dated Jul. 5, 2012).

Yeh Y. C.: "Triple-Triple Redundant 777 Primary Flight Computer"; IEEE Aerospace Applications Conference; vol. 1, pp. 293-307; XP000603215 (Feb. 1, 1996).

EP, European Search Report and Written Opinion; Patent Application No. 14198277.7, 11 pages (dated Apr. 28, 2015).

* cited by examiner

METHODS AND SYSTEMS FOR DETERMINING AIRSPEED OF AN AIRCRAFT

FIELD

The disclosed system and method relate to methods and systems for determining an aircraft airspeed and, more particularly, to methods and systems for determining an aircraft airspeed based on measurements of altitude and vertical acceleration of the aircraft.

BACKGROUND

Accurate measurement of an aircraft's airspeed is critical for control of the aircraft, affecting system operation and safety of the aircraft in all phases of flight. Airspeed may be directly determined, for example, using measured total pressure from pitot probes and static pressure from static ports mounted on the aircraft fuselage or side of pitot probes. Static ports or other types of ports or tubes may be useful in flight stages when the aircraft is high above ground in conditions where the static ports are mostly reliably free of contamination, such as contamination or influence from ground effects, thrust reverser efflux from the aircraft itself, and so on. During near-ground or on-ground operation of the aircraft, static ports mounted externally on the aircraft can become fouled by various types of contamination, distorting airspeed measurements and affecting the safety and operation of the aircraft. There is thus a need for methods for determining an aircraft's airspeed that do not rely solely on direct measurements from static ports or other ports on the aircraft.

SUMMARY

Embodiments of the invention disclosed herein provide methods and systems for determining airspeeds of an aircraft, and provide aircraft with implementing improved methods and systems for determining airspeeds of such aircraft. The technical effects and benefits of the disclosed invention allow an aircraft to accurately determine the airspeed of the aircraft without relying on external static ports of the aircraft for airspeed measurement, eliminating issues with external static port contamination during near-ground or on-ground operation of the aircraft. The disclosed invention allows the aircraft to use GPS altitude measurements and inertial reference system measurements to determine a geometric altitude rate of change and a pressure altitude rate of change, and use the pressure altitude rate of change calculation to determine a static pressure value. The static pressure value, in combination with other measurements, is used to determine the aircraft's airspeed.

In one example, a method for determining the airspeed of an aircraft is disclosed. The method includes obtaining, from a GPS device of the aircraft, a GPS altitude of the aircraft for a current time frame and, from one or more inertial reference devices of the aircraft, a vertical acceleration of the aircraft for the current time frame. A geometric altitude of the aircraft for a time frame prior to the current time frame is saved and used for the next time frame. A difference between the GPS altitude and the geometric altitude is determined, and this difference is used with the vertical acceleration to calculate a geometric altitude rate of change for the aircraft. A pressure altitude rate of change is calculated from the geometric altitude rate of change, and the pressure altitude rate of change is used to calculate a pressure altitude for the current time frame. The pressure altitude is used to calculate a static pressure for the current time frame, and the static pressure is used to determine the airspeed of the aircraft.

In another example, a system for determining the airspeed of an aircraft is disclosed. The system includes a GPS device of the aircraft capable of determining a GPS altitude of the aircraft, an inertial reference device of the aircraft capable of determining a vertical acceleration of the aircraft, and a computer system. The computer system includes one or more processors operatively connected to the GPS device and the one or more devices of the aircraft, a database operatively connected to the processor, and a memory operatively connected to the one or more processors and the database, the memory storing data comprising program code for execution by the one or more processors to perform a method for controlling performance of an aircraft. The method includes obtaining, from a GPS device of the aircraft, a GPS altitude of the aircraft for a current time frame and, from one or more inertial reference devices of the aircraft, a vertical acceleration of the aircraft for the current time frame. A geometric altitude of the aircraft for a time frame prior to the current time frame is saved and used for the next time frame. A difference between the GPS altitude and the geometric altitude is determined, and this difference is used with the vertical acceleration to calculate a geometric altitude rate of change for the aircraft. A pressure altitude rate of change is calculated from the geometric altitude rate of change, and the pressure altitude rate of change is used to calculate a pressure altitude for the current time frame. The pressure altitude is used to calculate a static pressure for the current time frame, and the static pressure is used to determine the airspeed of the aircraft.

In another example, an aircraft is disclosed. The aircraft includes a GPS device capable of determining a GPS altitude of the aircraft, an inertial reference device capable of determining a vertical acceleration of the aircraft, and a computer system. The computer system includes one or more processors operatively connected to the GPS device and the one or more devices of the aircraft, a database operatively connected to the processor, and a memory operatively connected to the one or more processors and the database, the memory storing data comprising program code for execution by the one or more processors to perform a method for controlling performance of an aircraft. The method includes obtaining, from a GPS device of the aircraft, a GPS altitude of the aircraft for a current time frame and, from one or more inertial reference devices of the aircraft, a vertical acceleration of the aircraft for the current time frame. A geometric altitude of the aircraft for a time frame prior to the current time frame is saved and used for the next time frame. A difference between the GPS altitude and the geometric altitude is determined, and this difference is used with the vertical acceleration to calculate a geometric altitude rate of change for the aircraft. A pressure altitude rate of change is calculated from the geometric altitude rate of change, and the pressure altitude rate of change is used to calculate a pressure altitude for the current time frame. The pressure altitude is used to calculate a static pressure for the current time frame, and the static pressure is used to determine the airspeed of the aircraft.

Other objects and advantages of the disclosed method and system will be apparent from the following description, the accompanying drawings and the appended claims.

DETAILED DESCRIPTION

Figure 1:
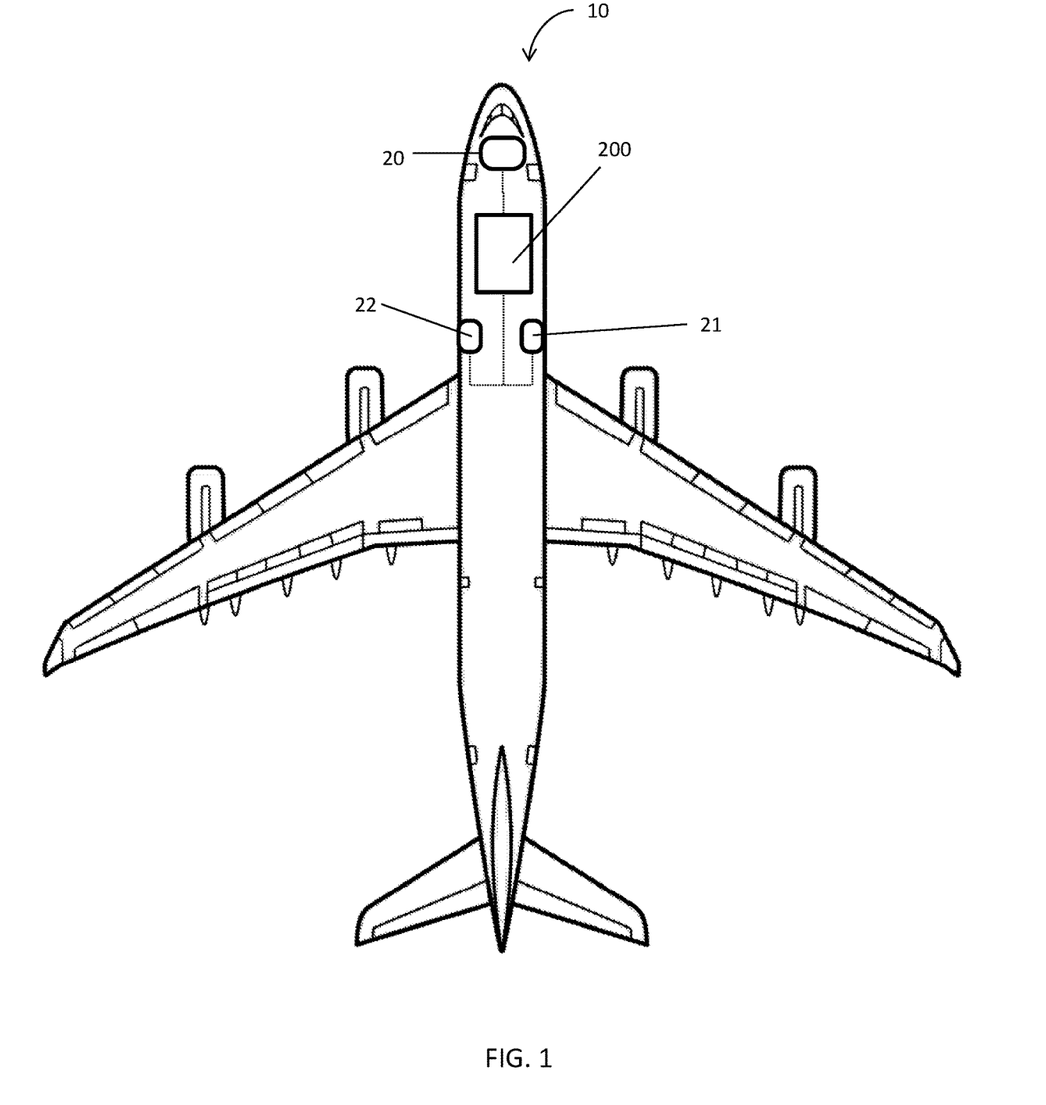
FIG. 1 is an exemplary schematic block diagram of an aircraft including the disclosed system for determining the airspeed of the aircraft.

FIG. 1 is an exemplary schematic block diagram of an aircraft 10 including a system for determining an airspeed of the aircraft, as described below. An aircraft 10 may be any aircraft, such as a fixed wing aircraft, a rotary wing aircraft, a propeller drive aircraft, a jet propelled aircraft, a commercial airplane, a military aircraft, or another type of aircraft or any aircraft that may be a combination of different types of aircraft, such as the fixed-wing commercial airplane depicted in the example of FIG. 1. Aircraft 10 includes a GPS device 20 capable of determining a GPS altitude of the aircraft, an inertial reference device 21 capable of obtaining measurements for determining a vertical acceleration of the aircraft, and may also include other devices 22, such as a radio altimeter, a pressure or barometric altimeter, external temperature sensors, external total pressure sensors, and other devices for obtaining or measuring other data related to the flight of the aircraft, as described below. GPS device 20 may be located anywhere on aircraft 10 as appropriate, and need not be located as shown in FIG. 1 nor limited to a single GPS device. Similarly, inertial reference devices 21 and other devices 22 may be located anywhere on aircraft 10 as appropriate, and need not be located as shown in FIG. 1 nor limited to any particular number of other devices or particular number of inertial reference devices.

Aircraft 10 also includes a computer system 200, as further described below and illustrated in FIG. 3. The computer system is operatively connected to GPS device 20, inertial reference device 21, and other devices 22 to obtain GPS data and other data, such as altitude measurements or pressure measurements or other measurements. As described further below, the electronic control system 200 includes computer program code for performing a method 100, described below and depicted in FIGS. 2-4, for determining the airspeed of the aircraft.

Figure 2:
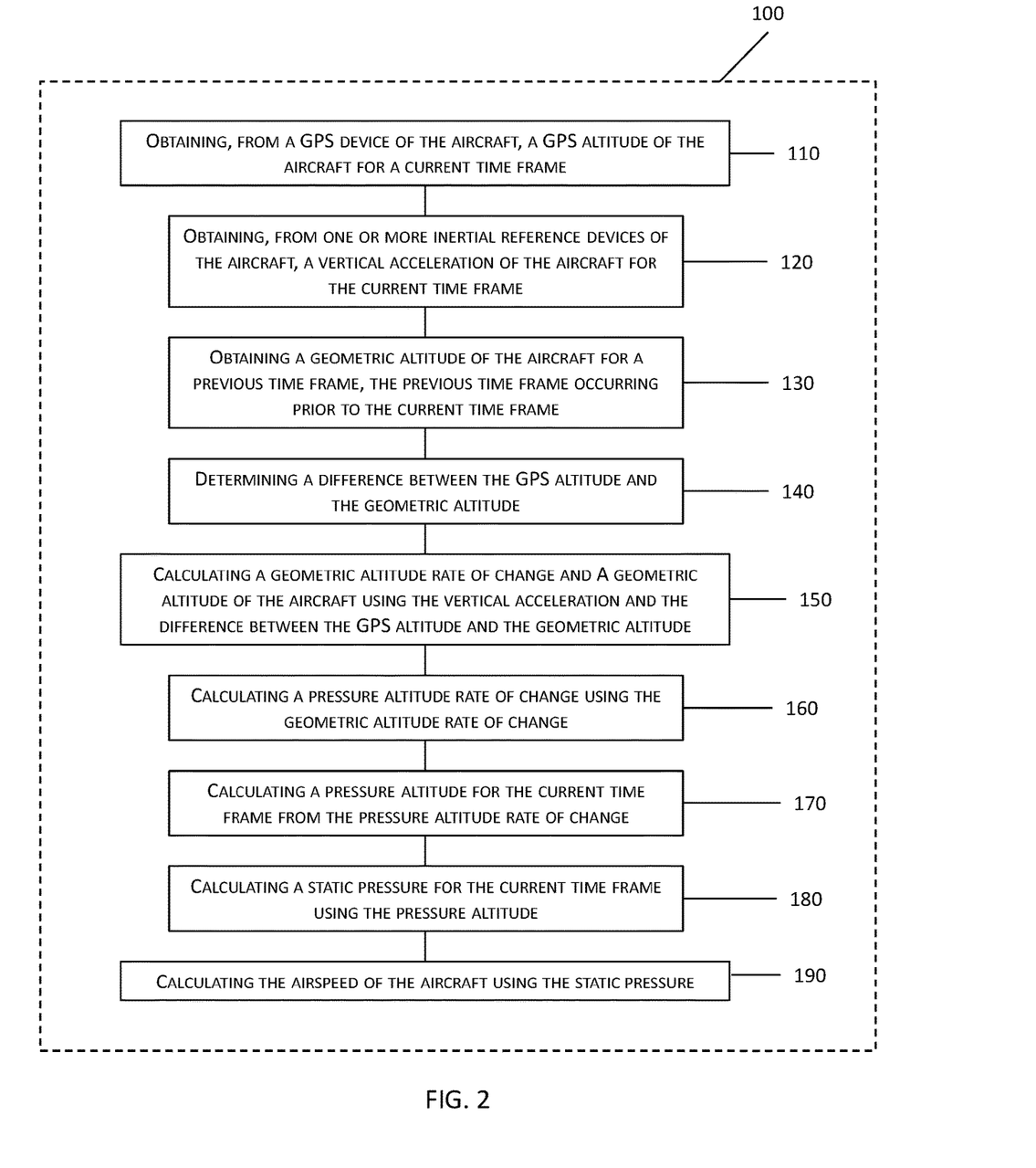
FIG. 2 is an exemplary process flow diagram of an embodiment of the disclosed method.

FIG. 2 is an exemplary process flow diagram illustrating a method 100 for determining an airspeed of an aircraft such as the exemplary aircraft 10 in FIG. 1. The method 100 generally begins at block 110 with obtaining, from a GPS device 20 of the aircraft, a GPS altitude of the aircraft for a current time frame. Generally, a GPS-determined position of an aircraft may be determined by the GPS device sending and receiving data from four (or more) GPS satellites positioned around the earth and deriving a position of the aircraft in three-dimensional space from the data. The GPS altitude can be derived, calculated, or directly determined from the position provided by the data. As the GPS device 20 of aircraft 10 may be operatively connected with GPS satellites continuously or for extended time periods during flight, a GPS-determined position of the aircraft may be determined repeatedly or continuously during flight at determined time intervals, such as every second, every half second, or other intervals as needed.

Continuing the process of FIG. 2, at block 120, a vertical acceleration of the aircraft for the current time frame is determined from an inertial reference device 21 of the aircraft 10. The vertical acceleration of an aircraft may generally be a function of gravitational acceleration at the aircraft's altitude, one or more load factors of the aircraft, the pitch and/or roll of the aircraft, and so on.

At block 130 of the process 100, a geometric altitude calculated and saved in the computer system 200 for a previous time frame is obtained. The previous time frame is a time frame occurring prior to the current time frame for which the GPS altitude and vertical acceleration are measured. As described in further detail below and with reference to FIG. 3, the geometric altitude for the previous time frame is calculated from a GPS altitude measured in the previous time frame and a vertical acceleration of the aircraft for the previous time frame. The GPS altitude and vertical acceleration of the aircraft for the previous time frame are combined with a geometric altitude determined from an earlier previous time frame, preceding the previous time frame, to calculate the geometric altitude for the previous time frame, as detailed below; in turn, the GPS altitude and vertical acceleration obtained for the current time frame are used and combined with the geometric altitude from the previous time frame to calculate a geometric altitude for the current time frame, and this geometric altitude for the current time frame becomes the geometric altitude for the next time frame in which a new GPS altitude and vertical acceleration are measured. Thus, the geometric altitude calculated for any one time frame is used in a following time frame, along with updated GPS altitude and vertical acceleration measurements for the following time frame, to calculate a new geometric altitude for the following time frame.

At block 140 of the process 100, a difference between the GPS altitude for the current time frame $h_{GPS}$ and the geometric altitude for the previous time frame $h_Z^{(p)}$ is calculated. The difference may generally be expressed as:

$$h_{GPS} - h_Z^{(p)} \qquad (1)$$

At block 150, the geometric altitude rate of change for the current time frame $\dot{h}_Z$ is calculated using the vertical acceleration for the current time frame $\ddot{h}_{IR}$ and using the difference between the GPS altitude for the current time frame $h_{GPS}$ and geometric altitude for the previous time frame $h_Z^{(p)}$. The geometric altitude rate of change may generally be calculated from a geometric altitude rate of change for the previous time frame $\dot{h}_Z^{(p)}$ by integrating the vertical acceleration $\ddot{h}_{IR}$ of the aircraft with a correction function $f_1$ of the difference between the GPS altitude and the geometric altitude in equation (1).

$$\dot{h}_Z = \dot{h}_Z^{(p)} + [\ddot{h}_{IR} + f_1(h_{GPS} - h_Z^{(p)})]\Delta t \qquad (2)$$

$\Delta t$ is the time interval from previous time frame to current time frame. Also at block 150 the geometric altitude for the current time frame, $h_Z$, may generally be calculated from the geometric altitude for the previous time frame $h_Z^{(p)}$ by integrating the geometric altitude rate of change in equation (2) with a correction function $f_2$ of the difference between the GPS altitude and the geometric altitude in equation (1).

$$h_Z = h_Z^{(p)} + [\dot{h}_Z + f_2(h_{GPS} - h_Z^{(p)})]\Delta t \qquad (3)$$

In embodiments, the process 100 may further include obtaining, from a radio altimeter of the aircraft, a radio-based altitude of the aircraft. If the radio-based altitude of the aircraft is below a pre-determined threshold altitude, the geometric altitude rate of change of the aircraft is calculated using the difference between the GPS altitude and the geometric altitude without using the vertical acceleration of the aircraft. That is, equation (3) above is modified to:

$$h_Z = h_Z^{(p)} + f_3(h_{GPS} - h_Z^{(p)})\Delta t \qquad (4)$$

$f_3$ is a correction function of the difference between the GPS altitude and the geometric altitude in equation (1). Using equation (4) at radio-based altitudes below the pre-determined threshold altitude may be desirable as at such low radio-based altitudes airplane is on the ground and the inertial reference device or devices 21 of the aircraft may be unable to reliably determine the vertical acceleration of the aircraft due to structural vibration from landing gear forces on ground. For takeoff operations, the process may start at a point in time where the airplane stands still on the runway. Once the aircraft has passed the threshold altitude where structural vibration from landing gear forces does not exist, the vertical acceleration of the aircraft may be used as in equation (3) to determine the geometric altitude and geometric altitude rate of change as described above. Conversely, if the process described herein is used to determine the airspeed of the aircraft during landing approach of the aircraft, equation (3) may be used to determine the geometric altitude and geometric altitude rate of change of the aircraft until the aircraft passes below the pre-determined radio-based altitude, at which time equation (4) may be used for the remaining landing operation. For landing approach operations, the process may start at a point where the airplane reaches radio-based altitude of about 800 feet for many aircraft to obtain a ground effect free static pressure. Although other starting radio-based altitudes may be selected for aircraft depending on aircraft specifications and requirements.

The process 100 continues at block 160 with calculating a pressure altitude rate of change using the geometric altitude rate of change. The pressure altitude rate of change can be expressed as a function of the geometric altitude rate of change combined with a ratio between a standard day temperature, $T_{StandardDay}$, and ambient temperature, $T_{Ambient}$.

$$\dot{h}_P = \dot{h}_Z \frac{T_{StandardDay}}{T_{Ambient}} \qquad (5)$$

The standard day temperature $T_{Ambient}$ is itself a function of pressure altitude, which can be calculated from the pressure altitude using standard formulas of the International Standard Atmosphere (ISA). The ambient temperature may be calculated as further described below and shown in FIG. 4.

The process 100 continues at block 170 with calculating a pressure altitude for the current time frame using the pressure altitude rate of change. As further described below, the pressure altitude for the current time frame, $h_P$, may be calculated as $$h_P = h_P^{(p)} + \dot{h}_P \Delta t \qquad (6)$$

where $h_P^{(p)}$ is a pressure altitude calculated for a previous time frame.

At block 180 of process 100, the pressure altitude for the current time frame is used to calculate a static pressure for the current time frame. As further described below, the static pressure is calculated based on the pressure altitude as $$p_S = p_0(1 - 6.875586 \times 10^{-6} h_P)^{5.2558797} \qquad (7)$$

where $p_0$ is the sea level static pressure at the ISA standard day condition.

Finally, at block 190 of process 100, the airspeed of the aircraft is calculated. The calculated airspeed of the aircraft $V_{cas}$ in knots may be determined using the static pressure as calculated in equation (7), and is also dependent on a measured total pressure $p_T$ as well as the sea level static pressure $p_0$ at the ISA standard day condition, as follows:

$$V_{cas} = 661.5 \sqrt{5\left[\left(\frac{p_T - p_S}{p_0} + 1\right)^{2/7} - 1\right]} \qquad (8)$$

The total pressure may be measured from a pressure sensor of the aircraft, such as an external pitot probe attached to the aircraft.

Figure 3:
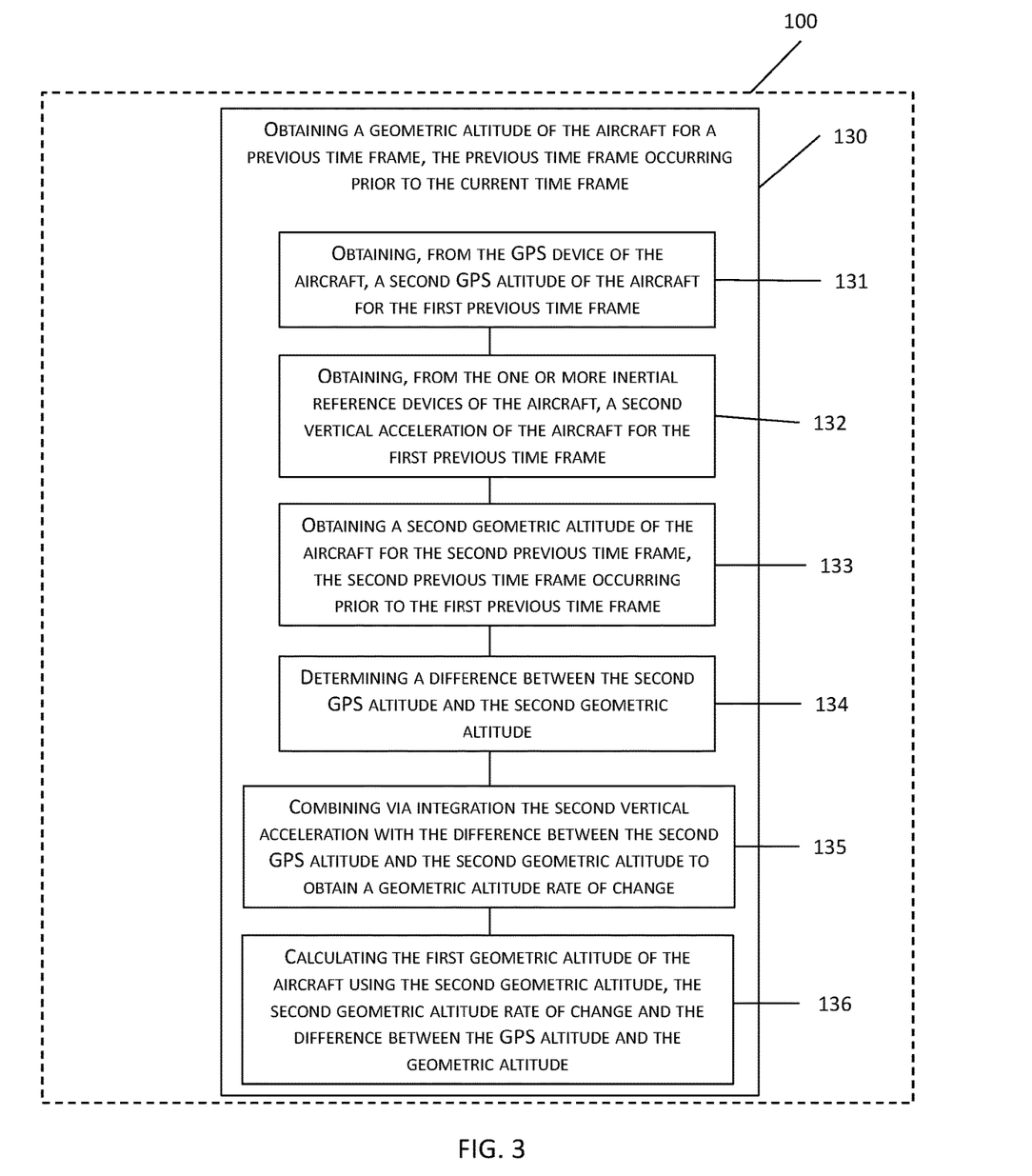
FIG. 3 is a process flow diagram of a further embodiment of the disclosed method.

Turning next to FIG. 3, in embodiments obtaining the geometric altitude for the previous time frame, as in block 130 of FIG. 2, may include obtaining a GPS altitude and vertical acceleration for the previous time frame and a geometric altitude for an earlier previous time frame. For ease of reference herein, the "previous time frame" will be referenced as a "first previous time frame" and the "earlier previous time frame" preceding the first previous time frame will be referenced as a "second previous time frame." Thus, at block 131, a GPS altitude of the aircraft for the first previous time frame is obtained, and at block 132 a vertical acceleration for the first previous time frame is obtained. A geometric altitude of the aircraft for the second previous time frame is also obtained at block 133. A difference between the GPS altitude for the first previous time frame and the geometric altitude for the second previous time frame is determined at block 134, and at block 135 this difference is combined via integration with the second vertical acceleration to obtain a geometric altitude rate of change. At block 136, the geometric altitude rate of change is combined with the geometric altitude for the second previous time frame (the earlier previous time frame) to calculate the geometric altitude for the first previous time frame. That is, equations (2) and (3) above are used at any particular time frame to determine the current geometric altitude $h_Z$ based on the current GPS altitude, current vertical acceleration, and the previously calculated geometric altitude. Consequently, the current geometric altitude at any particular current time frame then becomes the geometric altitude for the previous time frame when calculating an updated geometric altitude based on updated GPS altitude and updated vertical acceleration. The geometric altitude of the aircraft, and thus the geometric altitude rate of change of the aircraft, may be continuously updated and calculated for each current time frame based on measurements for the current time frame and calculations for the previous time frame.

Figure 4:
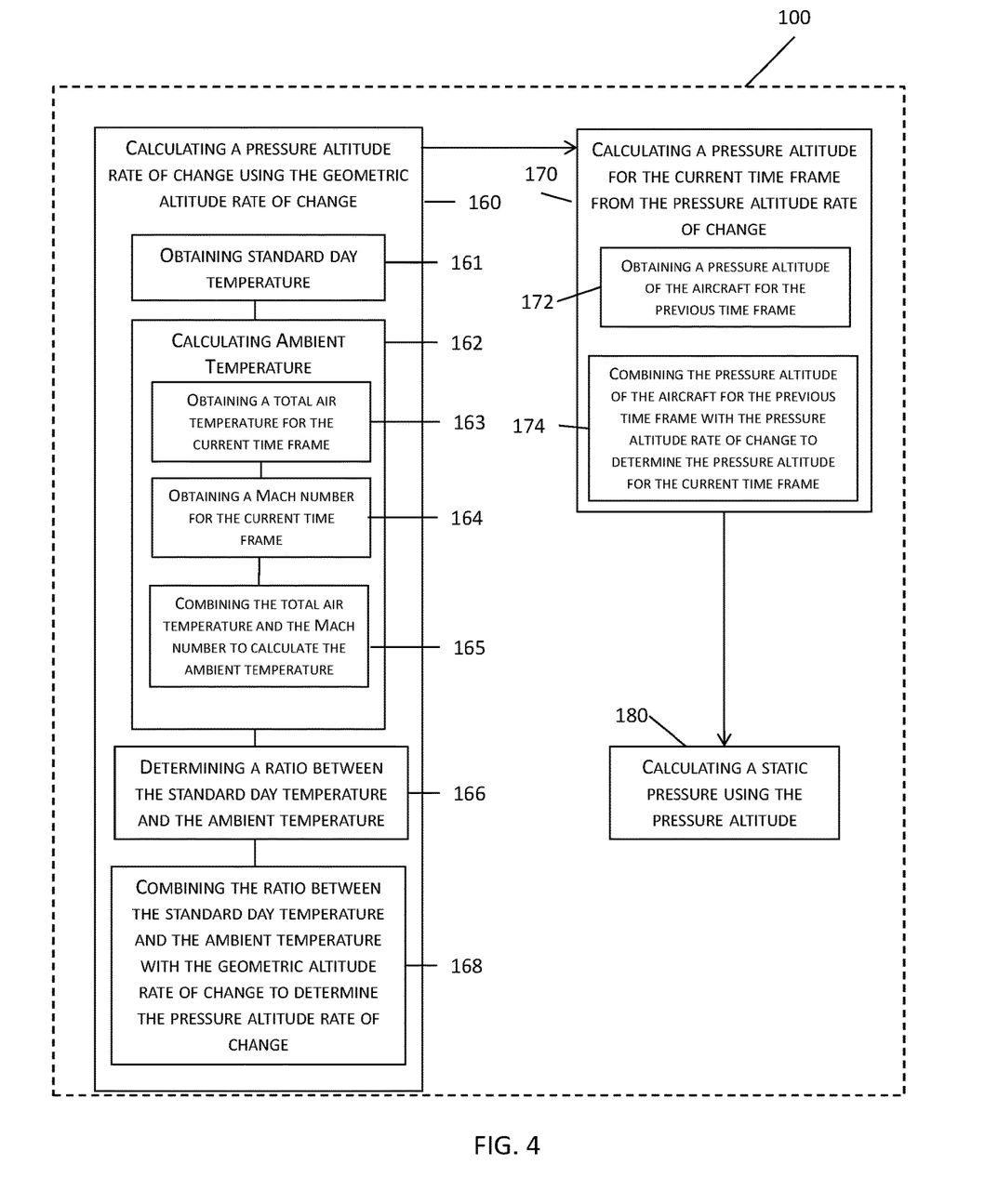
FIG. 4 is a process flow diagram of further embodiments of the disclosed method.

With reference to FIG. 4, calculating the pressure altitude rate of change 160 may include obtaining a standard day temperature 161 and calculating an ambient temperature 162. The process may then include determining a ratio between the standard day temperature and the ambient temperature 166, and combining the ratio between the standard day temperature and the ambient temperature with the geometric altitude rate of change to determine the pressure altitude rate of change 168. As described above in equation (5), the pressure altitude rate of change can be expressed as $$\dot{h}_P = \dot{h}_Z \frac{T_{StandardDay}}{T_{Ambient}} \qquad (5)$$

The standard day temperature is a function of pressure altitude, which can be calculated from the pressure altitude using standard formulas of the International Standard Atmosphere (ISA). The ambient temperature may be determined by, as shown in FIG. 4: obtaining, from an external temperature sensor of the aircraft, a total air temperature for the current time frame 163; obtaining a Mach number for the aircraft for the current time frame 164; and combining the total air temperature and the Mach number to calculate the ambient temperature 165. The ambient temperature may be expressed as a function of total external temperature $T_T$ and Mach number M, as $$T_{Ambient} = \frac{T_T}{1 + 0.2M^2} \qquad (9)$$

The Mach number in turn may be calculated from equation (10) below:

$$M = \sqrt{5[(p_T/p_S)^{2/7} - 1]} \qquad (10)$$

In equation (10), $p_S$ is the static pressure calculated using equation (7), above, for the previous time frame; that is, the current Mach number M for the current time frame, for the purposes of determining the ambient temperature, is derived from a calculation of the static pressure for the previous time frame. As FIG. 4 illustrates, the current Mach number is used to determine a current ambient temperature, which is used to calculate the pressure altitude rate of change $\dot{h}_P$ for the current time frame; the pressure altitude rate of change is then used to calculate a pressure altitude for the current time frame and a static pressure for the current time frame. The static pressure for the current time frame then becomes the static pressure for a previous time frame when re-calculating an updated Mach number, which is used to update the ambient temperature calculation, and so on.

Referencing FIG. 4 again, the pressure altitude for the current time frame is calculated from the pressure altitude rate of change 170. The pressure altitude is calculated by obtaining a pressure altitude for the previous time frame 172, and combining the pressure altitude for the previous time frame with the pressure altitude rate of change to determine the pressure altitude for the current time frame 174. The pressure altitude for the current time frame, $h_P$, may be calculated as $$h_P = h_P^{(p)} + \dot{h}_P \Delta t \qquad (6)$$

where $h_P^{(p)}$ is a pressure altitude calculated for a previous time frame. The pressure altitude rate of change for the previous time frame is calculated according to equation (5), above, for the previous time frame.

Referencing FIG. 4 again, the static pressure for the current time frame is calculated from the pressure altitude for the current time frame 180 as $$p_S = p_0(1 - 6.875586 \times 10^{-6} h_P)^{5.2558797} \qquad (7)$$

where $p_0$ is the sea level static pressure at the ISA standard day condition. The static pressure for the previous time frame is determined using the same equation (7) above using the pressure altitude determined for the previous time frame. Thus, the static pressure determined for any one current time frame is used to determine an updated Mach number for a following time frame, as described above.

Method 100 may be carried out by an electronic control system 200, as described below, repeatedly and continually "on the fly" during flight of an aircraft 10, as altitude data, pressure data, and temperature data may constantly be in flux during flight. Method 100 may allow, during near-ground and on-ground operation of the aircraft, for accurate determination of the aircraft's airspeed without relying on external ports to directly measure airspeed, as such external ports may be contaminated during such near-ground or on-ground operations.

Figure 5:
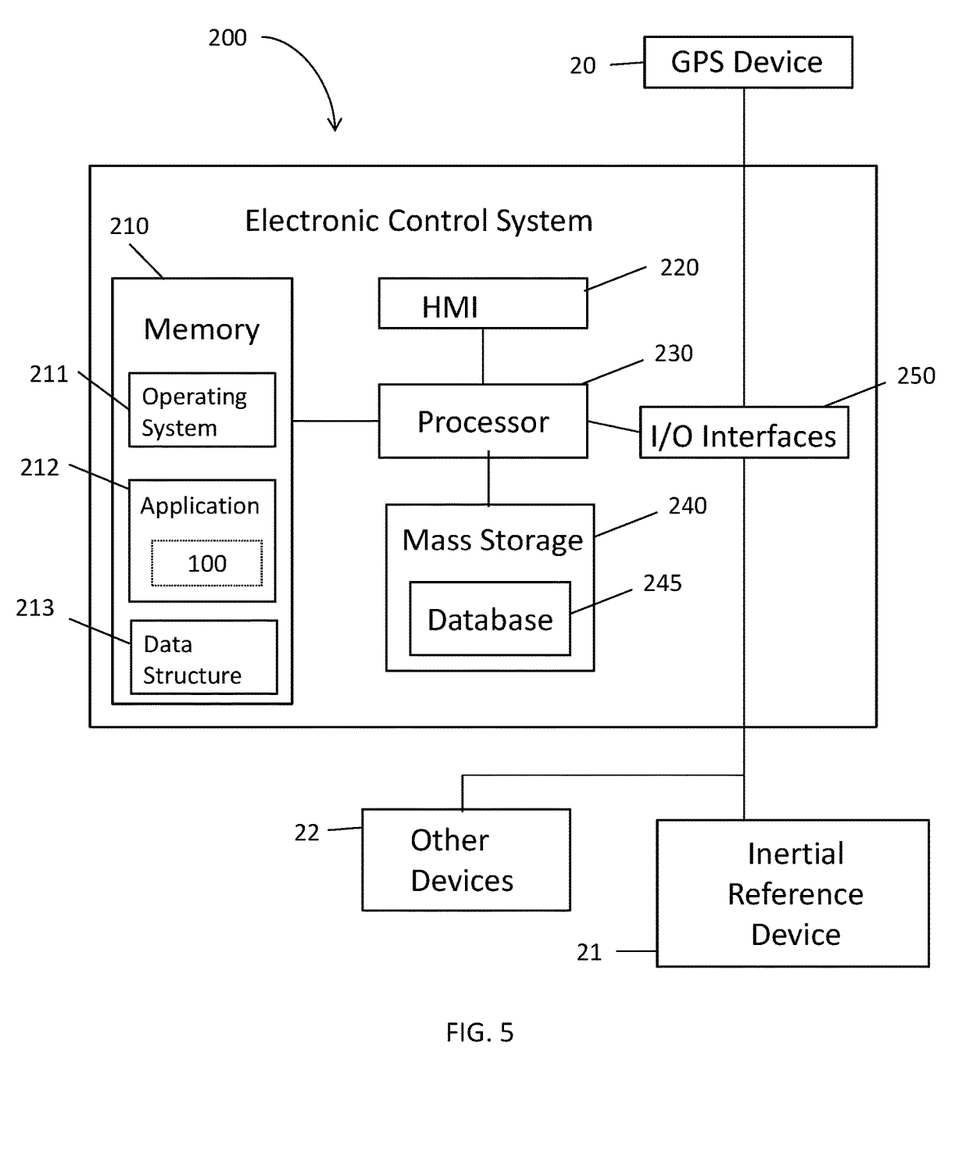
FIG. 5 is an exemplary schematic block diagram of a computer system capable of performing the methods of FIGS. 2-4.

Referring now to FIG. 5, the methods 100 described in FIGS. 2-4 above may be implemented on one or more electronic control systems such as exemplary computer system 200. The computer system 200 includes a processor 230, a memory 210, a mass storage memory device 240 that includes a database 245, one or more input/output (I/O) interfaces 250, and may include a Human Machine Interface (HMI) 220. The computer system 200 is operatively coupled to the GPS device 20 of the aircraft 10 and other devices 21, as depicted in FIG. 1, via an I/O interface 250. The processor 230 includes one or more devices selected from microprocessors, micro-controllers, digital signal processors, micro-computers, central processing units, field programmable gate arrays, programmable logic devices, state machines, logic circuits, analog circuits, digital circuits, or any other devices that manipulate signals (analog or digital) based on operational instructions that are stored in the memory 210. Memory 210 includes a single memory device or a plurality of memory devices including, but not limited to, read-only memory (ROM), random access memory (RAM), volatile memory, non-volatile memory, static random access memory (SRAM), dynamic random access memory (DRAM), flash memory, cache memory, or any other device capable of storing information. The mass storage memory device 240 includes data storage devices such as a hard drive, optical drive, tape drive, volatile or non-volatile solid state device, or any other device capable of storing information. The processor 230 operates under the control of an operating system 211 that resides in memory 210. The operating system 211 manages processing resources so that computer program code embodied as one or more computer software applications, such as an application 212 residing in memory 210, has instructions executed by the processor 230. In an alternative embodiment, the processor 230 executes the application 212 directly, in which case the operating system 211 may be omitted. One or more data structures 213 may also reside in memory 10, and may be used by the processor 230, operating system 211, or application 212 to store or manipulate data.

The I/O interface 250 provides a machine interface that operatively couples the processor 230 to other devices and systems, such as the GPS device 20 and other devices 21 of aircraft 10, such as a radar altimeter, barometric altimeter or pressure altimeter, temperature sensors, and so on. The application 212, which includes data comprising program code for execution by processor 230 to perform method 100 as described above, thereby works cooperatively with the sensors 20, main actuators 30, alternate actuators 40, and other systems of aircraft 10 by communicating via the I/O interface 250 to provide the various features, functions, applications, processes, or modules comprising embodiments of the invention. The application 212 has program code that is executed by, for example, main actuators 30 and alternate actuators 40, or otherwise rely on functions or signals provided by other system or network components external to the computer system 200. Indeed, given the nearly endless hardware and software configurations possible, persons having ordinary skill in the art will understand that embodiments of the invention may include applications that are located externally to the computer system 200, distributed among multiple computers or other external resources, or provided by computing resources (hardware and software) that are provided externally to computer system 200.

The HMI 220, if included, is operatively coupled to the processor 230 of computer system 200 in a known manner to allow a user to interact directly with the computer system 200. The HMI 220 may include video or alphanumeric displays, a touch screen, a speaker, and any other suitable audio and visual indicators capable of providing data to the user. The HMI 220 may also include input devices and controls such as an alphanumeric keyboard, a pointing device, keypads, pushbuttons, control knobs, microphones, etc., capable of accepting commands or input from the user and transmitting the entered input to the processor 230.

A database 245 resides on the mass storage memory device 240, and may be used to collect and organize data used by the various systems and modules described herein. The database 245 may include data and supporting data structures that store and organize the data. In particular, the database 245 may be arranged with any database organization or structure including, but not limited to, a relational database, a hierarchical database, a network database, or combinations thereof. A database management system in the form of a computer software application executing as instructions on the processor 230 may be used to access the information or data stored in records of the database 245 in response to a query, where a query may be dynamically determined and executed by the operating system 211, other applications 212, or one or more modules.

While the forms of apparatus and methods herein described constitute preferred examples of this invention, it is to be understood that the invention is not limited to these precise forms of apparatus and methods, and the changes may be made therein without departing from the scope of the invention.

What is claimed is:

1. A method of determining an airspeed of an aircraft, the method comprising:
   obtaining, from a GPS device of the aircraft, a GPS altitude of the aircraft for a current time frame;
   obtaining, from an inertial reference device of the aircraft, a vertical acceleration of the aircraft for the current time frame;
   obtaining a geometric altitude of the aircraft for a previous time frame, the previous time frame occurring prior to the current time frame;
   determining a difference between the GPS altitude and the geometric altitude;
   calculating a geometric altitude rate of change of the aircraft using the vertical acceleration and the difference between the GPS altitude and the geometric altitude;
   calculating a pressure altitude rate of change using the geometric altitude rate of change;
   calculating a pressure altitude for the current time frame from the pressure altitude rate of change;
   calculating a static pressure for the current time frame based on the pressure altitude and a sea level static pressure;
   calculating the airspeed of the aircraft using the static pressure;
   obtaining, from the radio altimeter, a radio-based altitude of the aircraft; and
   in response to determining the radio-based altitude is below a pre-determined threshold altitude, calculating the geometric altitude rate of change of the aircraft using the difference between the GPS altitude and the geometric altitude without using the vertical acceleration of the aircraft.

2. The method of claim 1 wherein the GPS altitude is a first GPS altitude, the vertical acceleration is a first vertical acceleration, the geometric altitude of the aircraft is a first geometric altitude, the geometric altitude rate of change is a first geometric altitude rate of change, and the previous time frame is a first previous time frame, and wherein obtaining the first geometric altitude of the aircraft for the first previous time frame comprises:
   obtaining, from the GPS device of the aircraft, a second GPS altitude of the aircraft for the first previous time frame;
   obtaining, from the inertial reference device of the aircraft, a second vertical acceleration of the aircraft for the first previous time frame;
   obtaining a second geometric altitude of the aircraft for a second previous time frame, the second previous time frame occurring prior to the first previous time frame;
   determining a difference between the second GPS altitude and the second geometric altitude;
   combining via integration the second vertical acceleration with the difference between the second GPS altitude and the second geometric altitude to obtain a second geometric altitude rate of change; and
   calculating the first geometric altitude of the aircraft using the second geometric altitude, the second geometric altitude rate of change and the difference between the GPS altitude and the geometric altitude.

3. The method of claim 1 wherein calculating the pressure altitude rate of change comprises:
   obtaining a standard day temperature; calculating an ambient temperature;
   determining a ratio between the standard day temperature and the ambient temperature; and
   combining the ratio between the standard day temperature and the ambient temperature with the geometric altitude rate of change to determine the pressure altitude rate of change.

4. The method of claim 3 wherein calculating the ambient temperature comprises:
   obtaining, from an external temperature sensor of the aircraft, a total air temperature for the current time frame;
calculating a Mach number for the aircraft for the current time frame; and
   combining the total air temperature and the Mach number to calculate the ambient temperature.

5. The method of claim 1 wherein calculating the pressure altitude for the current time frame comprises:
   obtaining a pressure altitude of the aircraft for the previous time frame;
   combining the pressure altitude of the aircraft for the previous time frame with the pressure altitude rate of change to determine the pressure altitude for the current time frame.

6. The method of claim 5 wherein calculating the static pressure for the current time frame comprises:
   calculating the static pressure using the pressure altitude for the current time frame.

7. The method of claim 6 wherein calculating the airspeed of the aircraft comprises: obtaining, from a total pressure sensor of the aircraft, a total pressure value; and
   combining the total pressure value, the static pressure for the current time frame, to calculate the airspeed of the aircraft.

8. A system for determining an airspeed of an aircraft, the system comprising:
a GPS device of the aircraft capable of determining a GPS altitude of the aircraft;
an inertial reference device of the aircraft capable of determining a vertical acceleration of the aircraft;
a computer system of the aircraft, the computer system including one or more processors operatively connected to the GPS device, the inertial reference device, and
one or more other devices of the aircraft, a database operatively connected to the one or more processors, and a memory operatively connected to the one or more processors and the database, the memory storing data comprising program code for execution by the one or more processors to perform a method for calculating the airspeed of the aircraft, the method comprising:
obtaining, from the GPS device, the GPS altitude of the aircraft for a current time frame;
obtaining, from the inertial reference device, the vertical acceleration of the aircraft for the current time frame;
obtaining a geometric altitude of the aircraft for a previous time frame, the previous time frame occurring prior to the current time frame;
determining a difference between the GPS altitude and the geometric altitude;
calculating a geometric altitude rate of change of the aircraft using the vertical acceleration and the difference between the GPS altitude and the geometric altitude;
calculating a pressure altitude rate of change using the geometric altitude rate of change;
calculating a pressure altitude for the current time frame from the pressure altitude rate of change;
calculating a static pressure for the current time frame based on the pressure altitude and a sea level static pressure;
calculating the airspeed of the aircraft using the static pressure;
obtaining, from a radio altimeter, a radio-based altitude of the aircraft; and
in response to determining the radio-based altitude is below a pre-determined threshold altitude, calculating the geometric altitude rate of change of the aircraft using the difference between the GPS altitude and the geometric altitude without using the vertical acceleration of the aircraft.

9. The system of claim 8 wherein the GPS altitude is a first GPS altitude, the vertical acceleration is a first vertical acceleration, the geometric altitude of the aircraft is a first geometric altitude, the geometric altitude rate of change is a first geometric altitude rate of change, and the previous time frame is a first previous time frame, and wherein obtaining the first geometric altitude of the aircraft for the first previous time frame comprises:
obtaining, from the GPS device of the aircraft, a second GPS altitude of the aircraft for the first previous time frame;
obtaining, from the inertial reference device of the aircraft, a second vertical acceleration of the aircraft for the first previous time frame;
obtaining a second geometric altitude of the aircraft for a second previous time frame, the second previous time frame occurring prior to the first previous time frame;
determining a difference between the second GPS altitude and the second geometric altitude;
combining via integration the second vertical acceleration with the difference between the second GPS altitude and the second geometric altitude to obtain a second geometric altitude rate of change; and
calculating the first geometric altitude of the aircraft using the second geometric altitude, the second geometric altitude rate of change and the difference between the GPS altitude and the geometric altitude.

10. The system of claim 8 wherein calculating the pressure altitude rate of change comprises:
obtaining a standard day temperature;
calculating an ambient temperature;
determining a ratio between the standard day temperature and the ambient combining temperature; and
the ratio between the standard day temperature and the ambient temperature with the geometric altitude rate of change to determine the pressure altitude rate of change.

11. The system of claim 10, further comprising an external temperature sensor of the aircraft, and wherein calculating the ambient temperature comprises:
obtaining, from the external temperature sensor, a total air temperature for the current time frame;
calculating a Mach number for the aircraft for the current time frame; and
combining the total air temperature and the Mach number to calculate the ambient temperature.

12. The system of claim 8 wherein calculating the pressure altitude for the current time frame comprises:
obtaining a pressure altitude of the aircraft for the previous time frame;
combining the pressure altitude of the aircraft for the previous time frame with the pressure altitude rate of change to determine the pressure altitude for the current time frame.

13. The system of claim 12 wherein calculating the static pressure for the current time frame comprises:
calculating the static pressure using the pressure altitude for the current time frame.

14. The system of claim 13 further comprising a total pressure sensor of the aircraft, and wherein calculating the airspeed of the aircraft comprises:
obtaining, from the total pressure sensor, a total pressure value; and
combining the total pressure value, and the static pressure for the current time frame to calculate the airspeed of the aircraft.

15. An aircraft comprising:
a GPS device capable of determining a GPS altitude of the aircraft;
an inertial reference device capable of determining a vertical acceleration of the aircraft;
a computer system, the computer system including one or more processors operatively connected to the GPS device, the inertial reference device, and one or more devices of the aircraft, a database operatively connected to the one or more processors, and a memory operatively connected to the one or more processors and the database, the memory storing data comprising program code for execution by the one or more processors to perform a method for calculating an airspeed of the aircraft, the method comprising:
obtaining, from the GPS device, the GPS altitude of the aircraft for a current time frame;
obtaining, from the inertial reference device, the vertical acceleration of the aircraft for the current time frame;

obtaining a geometric altitude of the aircraft for a previous time frame, the previous time frame occurring prior to the current time frame;
determining a difference between the GPS altitude and the geometric altitude;
calculating a geometric altitude rate of change of the aircraft using the vertical acceleration and the difference between the GPS altitude and the geometric altitude;
calculating a pressure altitude rate of change using the geometric altitude rate of change;
calculating a pressure altitude for the current time frame from the pressure altitude rate of change;
calculating a static pressure for the current time frame based on the pressure altitude and a sea level static pressure;
calculating the airspeed of the aircraft using the static pressure;
obtaining, from a radio altimeter, a radio-based altitude of the aircraft; and
in response to determining the radio-based altitude is below a pre-determined threshold altitude, calculating the geometric altitude rate of change of the aircraft using the difference between the GPS altitude and the geometric altitude without using the vertical acceleration of the aircraft.

16. The aircraft of claim 15 wherein the GPS altitude is a first GPS altitude, the vertical acceleration is a first vertical acceleration, the geometric altitude of the aircraft is a first geometric altitude, the geometric altitude rate of change is a first geometric altitude rate of change, and the previous time frame is a first previous time frame, and wherein obtaining the first geometric altitude of the aircraft for the first previous time frame comprises:
obtaining, from the GPS device, a second GPS altitude of the aircraft for the first previous time frame;
obtaining, from the inertial reference device, a second vertical acceleration of the aircraft for the first previous time frame;
obtaining a second geometric altitude of the aircraft for a second previous time frame, the second previous time frame occurring prior to the first previous time frame;
determining a difference between the second GPS altitude and the second geometric altitude;
combining via integration the second vertical acceleration with the difference between the second GPS altitude and the second geometric altitude to obtain a second geometric altitude rate of change; and
calculating the first geometric altitude of the aircraft using the second geometric altitude, the second geometric altitude rate of change and the difference between the GPS altitude and the geometric altitude.

17. The aircraft of claim 15 wherein calculating the pressure altitude for the current time frame and calculating the static pressure for the current time frame comprises:
obtaining a pressure altitude of the aircraft for the previous time frame;
combining the pressure altitude of the aircraft for the previous time frame with the pressure altitude rate of change to determine the pressure altitude for the current time frame;
calculating the static pressure using the pressure altitude for the current time frame.

18. The aircraft of claim 17 further comprising a total pressure sensor of the aircraft, and wherein calculating the airspeed of the aircraft comprises:

obtaining, from the total pressure sensor, a total pressure value; and
combining the total pressure value, and the static pressure for the current time frame to calculate the airspeed of the aircraft.

19. A method of determining an airspeed of an aircraft, the method comprising:
obtaining, from a GPS device of the aircraft, a GPS altitude of the aircraft for a current time frame;
obtaining, from an inertial reference device of the aircraft, a vertical acceleration of the aircraft for the current time frame;
obtaining a geometric altitude of the aircraft for a previous time frame, the previous time frame occurring prior to the current time frame;
determining a difference between the GPS altitude and the geometric altitude;
calculating a geometric altitude rate of change of the aircraft using the vertical acceleration and the difference between the GPS altitude and the geometric altitude;
calculating a pressure altitude rate of change using the geometric altitude rate of change;
calculating a pressure altitude for the current time frame from the pressure altitude rate of change;
calculating a static pressure for the current time frame based on the pressure altitude;
calculating the airspeed of the aircraft using the static pressure
obtaining, from the radio altimeter, a radio-based altitude of the aircraft; and
in response to determining the radio-based altitude is below a pre-determined threshold altitude, calculating the geometric altitude rate of change of the aircraft using the difference between the GPS altitude and the geometric altitude without using the vertical acceleration of the aircraft.

20. A method of determining an airspeed of an aircraft, the method comprising:
obtaining, from a GPS device of the aircraft, a GPS altitude of the aircraft for a current time frame;
obtaining, from an inertial reference device of the aircraft, a vertical acceleration of the aircraft for the current time frame;
obtaining a geometric altitude of the aircraft for a previous time frame, the previous time frame occurring prior to the current time frame;
determining a difference between the GPS altitude and the geometric altitude;
calculating a geometric altitude rate of change of the aircraft using the vertical acceleration and the difference between the GPS altitude and the geometric altitude;
calculating a pressure altitude rate of change using the geometric altitude rate of change by:
obtaining a standard day temperature; calculating an ambient temperature
determining a ratio between the standard day temperature and the ambient temperature; and
combining the ratio between the standard day temperature and the ambient temperature with the geometric altitude rate of change to determine the pressure altitude rate of change;
calculating a pressure altitude for the current time frame from the pressure altitude rate of change;
calculating a static pressure for the current time frame based on the pressure altitude; and calculating the airspeed of the aircraft using the static pressure.

21. The method of claim 20 wherein calculating the ambient temperature comprises:
obtaining, from an external temperature sensor of the aircraft, a total air temperature for the current time frame;
calculating a Mach number for the aircraft for the current time frame; and
combining the total air temperature and the Mach number to calculate the ambient temperature.

22. A system for determining an airspeed of an aircraft, the system comprising:
a GPS device of the aircraft capable of determining a GPS altitude of the aircraft; an inertial reference device of the aircraft capable of determining a vertical acceleration of the aircraft;
a computer system of the aircraft, the computer system including one or more processors operatively connected to the GPS device, the inertial reference device, and
one or more other devices of the aircraft, a database operatively connected to the one or more processors, and a memory operatively connected to the one or more processors and the database, the memory storing data comprising program code for execution by the one or more processors to perform a method for calculating the airspeed of the aircraft, the method comprising:
obtaining, from the GPS device, the GPS altitude of the aircraft for a current time frame;
obtaining, from the inertial reference device, the vertical acceleration of the aircraft for the current time frame;
obtaining a geometric altitude of the aircraft for a previous time frame, the previous time frame occurring prior to the current time frame;
determining a difference between the GPS altitude and the geometric altitude;
calculating a geometric altitude rate of change of the aircraft using the vertical acceleration and the difference between the GPS altitude and the geometric altitude;
calculating a pressure altitude rate of change using the geometric altitude rate of change;
calculating a pressure altitude for the current time frame from the pressure altitude rate of change by:
obtaining a standard day temperature;
calculating an ambient temperature;
determining a ratio between the standard day temperature and the ambient combining temperature; and
the ratio between the standard day temperature and the ambient temperature with the geometric altitude rate of change to determine the pressure altitude rate of change;
calculating a static pressure for the current time frame using the pressure altitude; and
calculating the airspeed of the aircraft using the static pressure.

23. A system for determining an airspeed of an aircraft, the system comprising:
a GPS device of the aircraft capable of determining a GPS altitude of the aircraft; an inertial reference device of the aircraft capable of determining a vertical acceleration of the aircraft;
a computer system of the aircraft, the computer system including one or more processors operatively connected to the GPS device, the inertial reference device, and
one or more other devices of the aircraft, a database operatively connected to the one or more processors, and a memory operatively connected to the one or more processors and the database, the memory storing data comprising program code for execution by the one or more processors to perform a method for calculating the airspeed of the aircraft, the method comprising:
obtaining, from the GPS device, the GPS altitude of the aircraft for a current time frame;
obtaining, from the inertial reference device, the vertical acceleration of the aircraft for the current time frame;
obtaining a geometric altitude of the aircraft for a previous time frame, the previous time frame occurring prior to the current time frame;
determining a difference between the GPS altitude and the geometric altitude;
calculating a geometric altitude rate of change of the aircraft using the vertical acceleration and the difference between the GPS altitude and the geometric altitude;
calculating a pressure altitude rate of change using the geometric altitude rate of change;
calculating a pressure altitude for the current time frame from the pressure altitude rate of change;
calculating a static pressure for the current time frame using the pressure altitude;
calculating the airspeed of the aircraft using the static pressure;
obtaining, from a radio altimeter of the aircraft, a radio-based altitude of the aircraft; and
in response to determining the radio-based altitude is below a pre-determined threshold altitude, calculating the geometric altitude rate of change of the aircraft using the difference between the GPS altitude and the geometric altitude without using the vertical acceleration of the aircraft.

24. The system of claim 23, further comprising an external temperature sensor of the aircraft, and wherein calculating the ambient temperature comprises:
obtaining, from the external temperature sensor, a total air temperature for the current time frame;
calculating a Mach number for the aircraft for the current time frame; and
combining the total air temperature and the Mach number to calculate the ambient temperature.

* * * * *

UNITED STATES PATENT AND TRADEMARK OFFICE
CERTIFICATE OF CORRECTION

PATENT NO. : 10,822,109 B2
APPLICATION NO. : 15/862703
DATED : November 3, 2020
INVENTOR(S) : Jia Luo Page 1 of 1

It is certified that error appears in the above-identified patent and that said Letters Patent is hereby corrected as shown below:

In the Claims

At Column 14, Lines 28-29, Claim 19 reads:
"calculating the airspeed of the aircraft using the static pressure"

Should read:
-- calculating the airspeed of the aircraft using the static pressure; --

At Column 14, Lines 56-57, Claim 20 reads:
"obtaining a standard day temperature; calculating an ambient temperature"

Should read:
-- obtaining a standard day temperature; calculating an ambient temperature; --

Signed and Sealed this
Twenty-seventh Day of July, 2021

Drew Hirshfeld
*Performing the Functions and Duties of the*
*Under Secretary of Commerce for Intellectual Property and*
*Director of the United States Patent and Trademark Office*